Patented Jan. 26, 1943

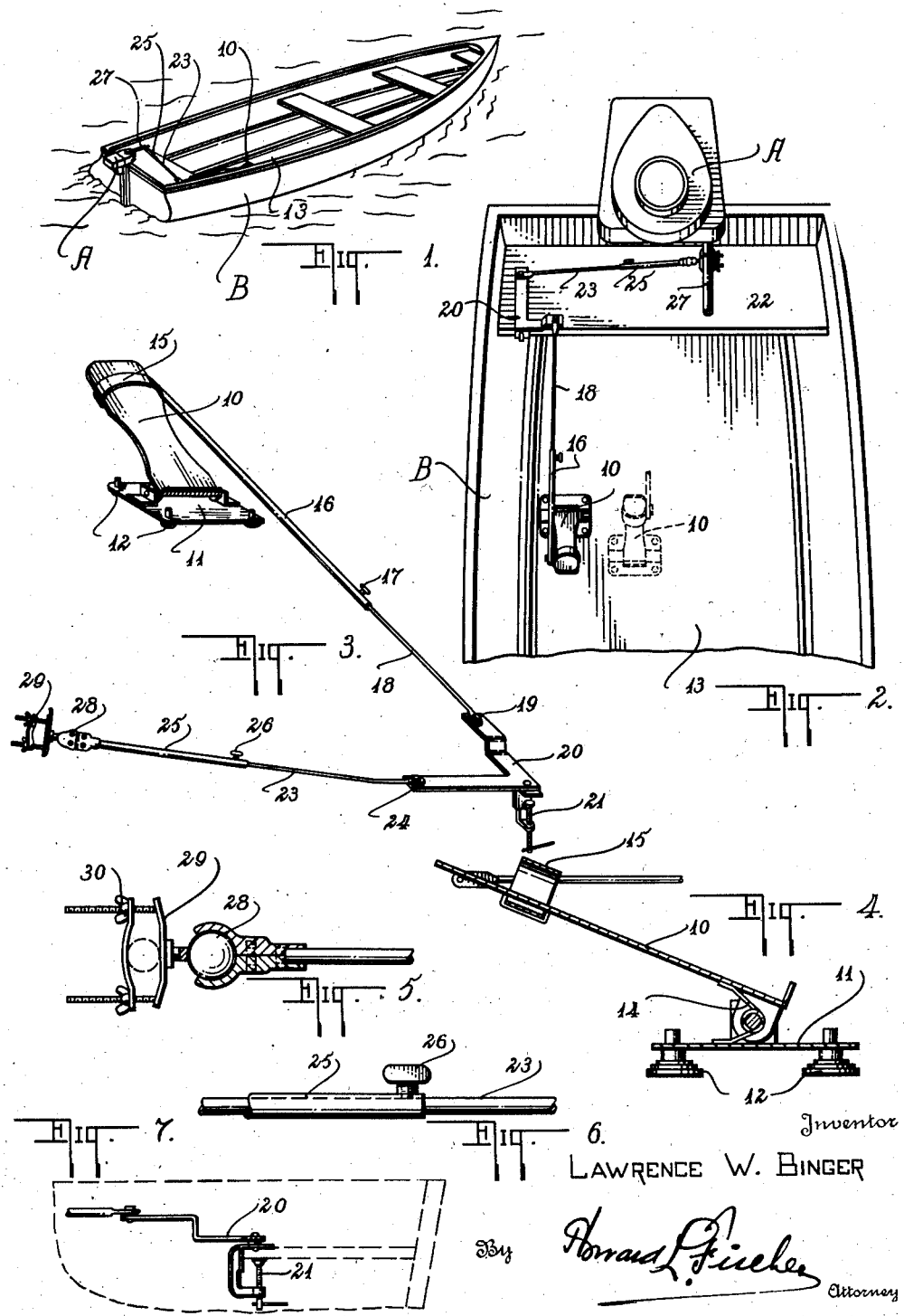

2,309,159

UNITED STATES PATENT OFFICE 2,309,159

FOOT STEERING DEVICE FOR OUTBOARD MOTORS

Lawrence W. Binger, St. Paul, Minn.

Application April 4, 1941, Serial No. 386,832

6 Claims. (Cl. 115—18)

This invention relates to a foot control for steering outboard motors for boats. This control is adjustable to fit virtually any size boat where an outboard motor is used.

A primary feature resides in providing a foot control so that the operator may place his foot on a pedal which has a strap under which his toe can engage, and by operating the pedal the boat may be steered, leaving the operator's hands free.

The control enables the operator of the boat to face directly ahead and will keep the boat in line or turn it at the slightest action of the operator's toe. The control will enable the operator to fish at ease and will keep the boat in line so as not to get the fishing lines entangled in the propeller.

A further advantage and feature of my steering control for boats is that the operator in fishing may cast and land fish without having to stop the motor, and can keep the boat in line and prevent it from drifting into weeds or turning about.

It is also a feature of my foot control for steering outboard motor boats to provide an adjustable means so that the operator of the boat may sit in the center of the seat of the boat, and by merely reversing the position of the foot pedal, steer the boat in any desired direction.

A still further feature resides in providing a means for steering outboard motors for boats which includes telescoping rod means which connect to a bell crank lever. The bell crank lever may be secured in the desired position on the seat at the rear of the boat, providing the proper leverage and connection with the steering handle of the outboard motor. The other telescoping rod means connects to a foot pedal which may be positioned in any convenient or desired point in the boat so that the person operating the boat can use his foot to steer in any direction.

These features together with other details and object will be more fully and clearly hereinafter set forth.

In the drawing forming a part of my specification:

Figure 1 illustrates a boat showing my steering device in operation therein.

Figure 2 is an enlarged plan view of a portion of the boat showing the outboard motor connected to the back, and showing my foot control for steering said outboard motor.

Figure 3 is a diagrammatic perspective view of my foot control steering means.

Figure 4 illustrates a side sectional view of the foot pedal control.

Figure 5 illustrates a detail partly in section of one of the connecting means of my foot control.

Figure 6 is a detail of a portion of the adjustable telescoping rod means.

Figure 7 is a detail of a portion of my steering means showing the manner in which the bell crank lever is connected to the seat, the seat and boat portion being illustrated in dotted outline.

My foot control for steering outboard motors includes a foot pedal 10 hingedly secured to a base plate 11. A series of rubber suction cups 12 or other supporting means may be secured to the bottom of the base plate 11, to hold the plate in operative position on the bottom 13 of the boat B.

The foot pedal 10 is held in neutral position by the spring 14 and I provide a toe strap 15 so that the operator may slip his toe under the strap and operate the foot pedal 10 up and down by the movement of his foot. The pedal 15 is connected to the tubular rod 16 which is adjustably secured through the set screw 17 to the rod 18. The rod 18 is secured at 19 to the bell crank lever 20.

The bell crank lever 20 is provided with a screw clamp 21 so that the bell crank lever 20 can be secured to the seat 22 of the boat B, as illustrated in Figures 1, 2 and 7. A rod 23 is pivotally connected at 24 to the other end of the bell crank 20 and by means of the tubular rod 25 and the set screw 26 an adjustable connecting rod means, namely, the rod 23 and the tubular rod 25, is provided for connecting with the steering handle 27 of the outboard motor A.

A ball joint 28 is provided on the end of the rod 25 which connects with an adjustable clamp 29 operated by the thumb screw 30 to attach the clamp 29 to the steering handle 27 which operates the outboard motor A to turn the same to steer the boat B.

It will be apparent that the foot pedal 10 may be placed so that the operator may sit on the seat 22, face forward, and steer the boat B by operating his left foot which would rest on the pedal 10 and engage under the strap 15. Thus as the operator of the boat moved his foot up or down, the boat B can be steered in the direction desired.

My foot control for steering outboard motors for boats is very desirable for fishermen, or others wishing to steer a boat without making it necessary to use the operator's hands, thus leaving the operator free to fish, cast, draw in the fish, and manipulate his fishing equipment with both hands while he steers the boat with his foot.

The foot pedal 10 may be turned about as illustrated in dotted outline in Figure 2, so that the operator may face backward, and still operate the boat with his foot. It is also apparent that the rods 16, 18, 23 and 25, provide adjustable means so that the connecting means with the foot pedal 10 may be set in any desired position and be extended or shortened, as the case may require, to provide an adjustable foot control for steering outboard motors as I have described and set forth.

It will be apparent also that the spring 14 will compensate for the weight of the foot pedal 10 which may be made of metal or other suitable material, and which is adapted to hold the foot pedal 10 normally in a neutral position. Then when the operator's foot is on the pedal 10 with his toe under the strap 15, he may operate the pedal 10 up or down to steer the motor A and thus in turn steer the boat B.

The details and features are shown in a particular form, however, these are only illustrative of a means of carrying out the principles of my invention, for it is apparent that other means may be provided within the scope of the following claims and yet be wholly within the spirit, purpose and intent of my invention.

I claim:

1. A foot control for outboard motors including means connected to the steering handle of the outboard motor, and a foot pedal adapted to operate said connecting means by the up and down movement of the operator's foot whereby the outboard motor is turned to steer in the direction desired by the operator.

2. A foot control for steering outboard motors including a foot pedal, spring means for balancing said foot pedal into neutral position, adjustable rod and link means connecting said foot pedal to the steering handle of an outboard motor, whereby the operator of the boat may steer it in any direction while his hands are free to fish, cast, and catch fish, while he operates the boat with the up or down movement of his foot.

3. A foot control for outboard motors including a foot pedal for the operator of the boat, adjustable rod and link means connecting said foot pedal to the steering handle of an outboard motor, said foot pedal adapted to be operated by the up and down movement of the operator's foot to steer the boat in the direction desired.

4. A foot control for an outboard motor including a foot pedal, a steering handle on said motor for moving said motor, lever means connecting said foot pedal to the handle of said motor, and said foot pedal adapted to move said motor by the up or down movement of the operator's foot on said pedal.

5. A foot control for an outboard motor including a foot operated pedal, means for supporting said pedal in a boat, a bell-crank lever, adjustable connecting rod means connecting said pedal and the steering handle of the outboard motor with said bell-crank means, whereby the operator of the boat may move his foot up or down on the pedal to steer the boat in the direction desired.

6. A foot control for outboard motors including means connected to the steering handle of the outboard motor, a foot pedal adapted to operate said connecting means by the up or down movement of the operator's foot, whereby the outboard motor is turned to steer in the direction desired by the operator, and said foot pedal adapted to be adjustable to permit the operator to steer the boat while sitting forward or backward in the boat.

LAWRENCE W. BINGER.